US012584007B2

(12) United States Patent
Hallot

(10) Patent No.: US 12,584,007 B2
(45) Date of Patent: Mar. 24, 2026

(54) POLYPROPYLENE COMPOSITION

(71) Applicant: INEOS EUROPE AG, Vaud (CH)

(72) Inventor: Gaetane Hallot, Grimbergen (BE)

(73) Assignee: INEOS EUROPE AG, Vaud (CH)

( * ) Notice: Subject to any disclaimer, the term of this patent is extended or adjusted under 35 U.S.C. 154(b) by 1014 days.

(21) Appl. No.: 17/769,446

(22) PCT Filed: Oct. 15, 2020

(86) PCT No.: PCT/EP2020/079027
§ 371 (c)(1),
(2) Date: Apr. 15, 2022

(87) PCT Pub. No.: WO2021/074289
PCT Pub. Date: Apr. 22, 2021

(65) Prior Publication Data
US 2024/0124694 A1 Apr. 18, 2024

(30) Foreign Application Priority Data
Oct. 16, 2019 (EP) ..................................... 19203565

(51) Int. Cl.
*C08L 23/10* (2006.01)
*C08L 23/12* (2006.01)
*C08L 23/14* (2006.01)
*C08L 23/16* (2006.01)

(52) U.S. Cl.
CPC ........... *C08L 23/12* (2013.01); *C08L 2207/20* (2013.01)

(58) Field of Classification Search
None
See application file for complete search history.

(56) References Cited

U.S. PATENT DOCUMENTS

| | | | |
|---|---|---|---|
| 4,210,738 A | 7/1980 | Hermans et al. | |
| 2015/0322215 A1 | 11/2015 | Hallot | |

FOREIGN PATENT DOCUMENTS

| | | | | |
|---|---|---|---|---|
| EP | 2145923 A1 | 1/2010 | | |
| EP | 3450472 A1 * | 3/2019 | .............. | C08L 23/12 |
| WO | 2016/066453 | 5/2016 | | |
| WO | 2016135107 A1 | 9/2016 | | |
| WO | 2017/005837 | 1/2017 | | |

OTHER PUBLICATIONS

International Search Report and Written Opinion of the ISA for PCT/EP2020/079027, mailed Dec. 9, 2020, 12 pages.

* cited by examiner

*Primary Examiner* — Michael J Feely
(74) *Attorney, Agent, or Firm* — NIXON & VANDERHYE, PC

(57) ABSTRACT

A composition comprising a polypropylene copolymer containing 0.5-7 mol % ethylene comonomer an having an MFR of 5-50 g/10 min and a relative proportion of isolated and block comonomer sequences in the polypropylene (I(E)) in the range of 5-40 is disclosed, wherein I(E) is defined as $I(E)=f_{PEP}/((f_{EEE}+f_{PEE}+f_{PEP}))*100$ in which I(E) is the relative content of isolated to block ethylene sequences (in %); $f_{PEP}$ is the mol fraction of propylene/ethylene/propylene sequences (PEP) in the sample; $f_{PEE}$ is the mol fraction of propylene/ethylene/ethylene sequences (PEE) and of ethylene/ethylene/propylene sequences (EEP) in the sample; and $f_{EEE}$ is the mol fraction of ethylene/ethylene/ethylene sequences (EEE) in the sample, all sequence concentrations being based on a statistical triad analysis of $^{13}C$-NMR data. The composition preferably comprises a blend of a propylene homopolymer and a propylene-ethylene copolymer, and the propylene-ethylene copolymer is preferably a polypropylene post-consumer resin (PCR).

24 Claims, No Drawings

POLYPROPYLENE COMPOSITION

This application is the U.S. national phase of International Application No. PCT/EP2020/079027 filed Oct. 15, 2020, which designated the U.S. and claims priority to EP patent application Ser. No. 19/203,565.7 filed Oct. 16, 2019, the entire contents of each of which are hereby incorporated by reference.

POLYPROPYLENE COMPOSITION

The present invention relates in general to polypropylene copolymer compositions, and in particular compositions which comprise blends of a polypropylene homopolymer and recycled polypropylene, and which are suitable for making into moulded articles. More particularly the invention concerns articles where high stiffness and excellent injectability are required at the same time as acceptable impact resistance. Examples of such articles include furniture items, crates, transport boxes and other large injection moulded articles.

Polypropylene homopolymers are commonly used in applications where high rigidity is required. If rigid articles are to be made by injection moulding the a homopolymer having a relatively high MFR and hence high fluidity may be selected. However it is very well known that high rigidity is associated with poor impact resistance, which is not desirable in many applications. As a result it is common to incorporate comonomers such as ethylene into propylene polymers, which increases impact resistance but reduces rigidity.

If comonomers are randomly distributed within the polymeric chain, a propylene random copolymer is obtained. Propylene random copolymers can be used in blow moulding, injection moulding and film extrusion applications for the preparation of materials such as food packaging, medical packaging and consumer products. For specific applications, large amounts of comonomer may need to be incorporated into the polypropylene, e.g. to provide a material having a higher flexibility and softness, and also greater impact strength.

In a copolymer the degree of randomness of the comonomer distribution within the polypropylene can vary. The ethylene units can be distributed such that they exist predominantly as isolated ethylene units between propylene units, or alternatively such that two or more ethylene units are located in sequence (in a "block"). The nature of the ethylene distribution is believed to have an influence on the crystallisation behaviour of the polymer and therefore also on its solid state, mechanical properties. The ethylene distribution can be measured by comparing the relative proportions of isolated and block comonomer sequences in the polymer, and for ethylene can be expressed by the parameter I(E), where I(E) is defined as $$I(E)=f_{PEP}/((f_{EEE}+f_{PEE}+f_{PEP}))*100$$

in which I(E) is the relative content of isolated to block ethylene sequences (in %); $f_{PEP}$ is the mol fraction of propylene/ethylene/propylene sequences (PEP) in the sample; $f_{PEE}$ is the mol fraction of propylene/ethylene/ethylene sequences (PEE) and of ethylene/ethylene/propylene sequences (EEP) in the sample; $f_{EEE}$ is the mol fraction of ethylene/ethylene/ethylene sequences (EEE) in the sample, all sequence concentrations being based on a statistical triad analysis of $^{13}$C-NMR data. Thus the higher the value of I(E), the greater the randomness of the ethylene distribution in the propylene copolymer.

An example of a random copolymer is disclosed in WO 2016/135107, which describes propylene-ethylene random copolymers having good impact strength which are suitable for injection moulded articles. These copolymers contain 2-5 mol % ethylene and have a relatively high degree of randomness, as can be seen from the inventive Example which has an I(E) value of 66.3%. They also have low rigidity, as shown by the tensile modulus of the inventive Example which is only 1089 MPa.

It is also known to blend polypropylene homopolymers or random copolymers with other propylene-based materials in order to modify their properties. In particular it is known to blend polypropylene homopolymers or random copolymers with propylene-ethylene copolymers which contain a high proportion of ethylene. This produces heterophasic blends which are generally less rigid than pure homopolymers or random copolymers due to the presence of the rubber phase. Such heterophasic polypropylene copolymers can be prepared in processes utilising two or more reactors in series.

Examples of heterophasic polypropylene compositions are disclosed in WO 2017/005837 and WO 2016/066453. WO 2017/005837 discloses polypropylene compositions suitable for producing tubes for protecting optical fibres in a fibre optic cable. The compositions comprise at least 20 wt % of a crystalline propylene homopolymer and a rubber phase containing ethylene comonomer. The distribution of the ethylene in the heterophasic polypropylene composition is measured by determining the I(E) of the composition. The Examples, which are said to have good stiffness and impact strength, contain 9.57 wt % (13.7 mol %) and 12.34 wt % (17.4 mol %) of ethylene respectively, and have I(E) values of 14.92 and 13.11%, indicating a relatively low degree of randomness. The Examples have a low flexural modulus in the range 1100-1200 MPa. In WO 2016/066453 the inventive Examples all contain at least 11.4 wt % (16.2 mol %) of ethylene, and have MFRs of 5-16 g/10 min, I(E) values in the range 12.5-25.0%, and a low flexural modulus below 1000 MPa.

A further example of a heterophasic polypropylene composition is disclosed in EP 2145923A. This discloses polypropylene compositions suitable for producing non-pressure pipes. The compositions comprise a propylene polymer containing less than 1 wt % ethylene and up to 7.5 wt % of a rubber phase containing 20-45 wt % of comonomer. The total ethylene content in the Examples is below 2 wt % and consequently they have very high stiffness. However the compositions have an MFR of no higher than 1.5 g/10 min, and are intended for extrusion into pipes rather than for moulding processes where high flowability is required. The I(E) is not disclosed.

There is increasing demand to recycle all types of plastic including polypropylene, and therefore a desire to incorporate polypropylene post-consumer resin (PCR) into new compositions, if feasible. There is also a continuing desire to find polypropylene compositions having good rigidity and also good impact resistance. This is a particular challenge when the composition contains a polypropylene PCR.

The present invention provides a composition comprising a polypropylene copolymer containing 0.5-7 mol % ethylene comonomer an having an MFR of 5-50 g/10 min and a relative proportion of isolated and block comonomer sequences in the polypropylene (I(E)) in the range of 5-40, wherein I(E) is defined as I(E)=$f_{PEP}/((f_{EEE}+f_{PEE}+f_{PEP}))$ *100 in which I(E) is the relative content of isolated to block ethylene sequences (in %); $f_{PEP}$ is the mol fraction of propylene/ethylene/propylene sequences (PEP) in the sample; $f_{PEE}$ is the mol fraction of propylene/ethylene/ethylene sequences (PEE) and of ethylene/ethylene/propylene sequences (EEP) in the sample; and $f_{EEE}$ is the mol fraction of ethylene/ethylene/ethylene sequences (EEE) in the sample, all sequence concentrations being based on a statistical triad analysis of $^{13}$C-NMR data.

Ethylene content for the compositions of the invention is determined by $^{13}$C-NMR, which is used to determine the I(E) value.

The composition preferably has a relationship between ethylene content in mol % (E) and the relative proportions of isolated and block comonomer sequences in the polypropylene (I(E)) defined by I(E)<60-5E and more preferably I(E)<45-5E.

It is preferred that the composition contains 1-6 mol % ethylene. It is also preferred that the absolute value of I(E) is in the range 10-30%.

Preferred compositions satisfy the relationship I(E)<60-5E and contain 0.5-7 mol % of ethylene, more preferably 1-6 mol % ethylene. Additionally or alternatively such compositions may have an absolute value of I(E) in the range 5-40, preferably 10-30.

Other preferred compositions satisfy the relationship I(E) <45-5E and contain 0.5-7 mol % of ethylene, more preferably 1-6 mol % ethylene. Additionally or alternatively such compositions may have an absolute value of I(E) in the range 5-40, preferably 10-30.

All of the above compositions preferably have an MFR in the range 10 to 40 g/10 min, more preferably 10 to 30 g/10 min.

A particularly preferred composition has an MFR of 10 to 30 g/10 min, a value of I(E) in the range of 10-30 and contains 1-6 mol % ethylene.

We have found that the above compositions have a particularly good balance of rigidity and impact resistance. In particular they have good impact resistance for a given level of rigidity, whilst also having good flowability due to the relatively high MFR, thereby making them suitable for moulding processes. It is believed that a major contributor to this balance of properties is the combination of low ethylene content and low I(E). The low ethylene content is responsible for the high flexural modulus (as is well known), whilst the low I(E) results in a biphasic structure which gives good impact properties, particularly at low temperature. The combination of both at the same time in a composition also having good flowability is unexpected.

The composition preferably has a flexural modulus of 1300-1900 MPa, more preferably 1400-1800 MPa. Flexural modulus is measured at 23° C. on an injected test piece of a thickness of 4 mm according to ISO178.

The composition preferably has a notched IZOD impact resistance at 0° C. of at least 2.0 kJ/m$^2$, preferably at least 2.5 kJ/m$^2$, measured according to ISO180/1A. The specimens are prepared according to ISO1873-2.

In a preferred embodiment the compositions of the invention comprise a blend of a propylene homopolymer and a propylene-ethylene copolymer. By "propylene homopolymer" is meant a propylene polymer containing less than 0.5 mol % of comonomer.

The propylene homopolymer preferably comprises 45-90 wt %, more preferably 50-80 wt % and most preferably 55-75 wt % of the composition.

The propylene homopolymer preferably has an MFR of 1-40 g/10 min, more preferably 3-30 g/10 min.

The propylene homopolymer preferably has a flexural modulus of 1200-2400 MPa, more preferably 1400-2200 MPa.

The propylene-ethylene copolymer preferably comprises 10-60 wt %, more preferably 20-60 wt % and most preferably 25-55 wt % of the composition.

The propylene-ethylene copolymer preferably has an MFR of 5-50 g/10 min, more preferably 10-30 g/10 min. It preferably contains 5-25 mol %, more preferably 7-20 mol % and most preferably 8-15 mol % ethylene.

The propylene-ethylene copolymer preferably has a relative content of isolated to block ethylene sequences (in %), I(E), of 5-30%, preferably 8-25% and most preferably 10-20%.

The propylene-ethylene copolymer preferably has a flexural modulus of 1000-1500 MPa, more preferably 1100-1400 MPa.

The propylene-ethylene copolymer preferably has a notched IZOD impact resistance at 23° C. of at least 4.5 kJ/m$^2$, preferably at least 5.0 kJ/m$^2$, measured according to ISO180/1A. The specimens are prepared according to ISO1873-2.

A preferred composition of the invention comprises a blend of 45-90 wt % of a propylene homopolymer which has an MFR of 1-40 g/10 min, and 10-55 wt % of a propylene-ethylene copolymer which has an MFR of 5-50 g/10 min, contains 5-25 mol % ethylene and has a relative content of isolated to block ethylene sequences (in %), I(E), of 5-30.

Another preferred composition comprises a blend of 50-80 wt % of a propylene homopolymer which has an MFR of 1-40 g/10 min, and 20-50 wt % of a propylene-ethylene copolymer which has an MFR of 5-50 g/10 min, contains 7-20 mol % ethylene and has a relative content of isolated to block ethylene sequences (in %), I(E), of 8-25.

Another preferred composition comprises a blend of 55-75 wt % of a propylene homopolymer which has an MFR of 3-30 g/10 min, and 25-45 wt % of a propylene-ethylene copolymer which has an MFR of 10-30 g/10 min, contains 8-15 mol % ethylene and has a relative content of isolated to block ethylene sequences (in %). I(E), of 10-20.

The propylene-ethylene copolymer preferably comprises post consumer resin (PCR). A particularly surprising finding of the invention is that polypropylene PCR can provide the preferred properties of the propylene copolymer as set out above, and when combined with a polypropylene homopolymer can provide a composition according to the invention without further modification. In all of the above preferred compositions of the invention, the propylene copolymer is preferably a polypropylene PCR.

Preferably, the polypropylene copolymer (which preferably comprises a blend of a propylene homopolymer and propylene-ethylene copolymer as described above) comprises at least 95 wt %, more preferably at least 98 wt % of the polymer content of the composition of the invention. It is most preferred that it constitutes substantially all of the polymer content of composition. The polymer content of the composition may also include up to 5 wt % of other polymers, but this is not preferred.

The non-polymer content of the composition may include fillers, stabilizers, pigments, antacids or nucleation agents, preferably amounting to no more than 5 wt % in total based on the weight of the overall composition.

Any nucleating agent is preferably an inorganic nucleating agent, an organic nucleating agent or a polymeric nucleating agent. Organic nucleating agents are preferred. The amount of nucleating agent is preferably 50-1000 ppm, more preferably 100-500 ppm.

The composition of the present invention can be obtained by any appropriate technique. It is preferably obtained by physically blending a polypropylene homopolymer with an ethylene-containing polypropylene copolymer. One can, for example, mix the homopolymer and the copolymer and any desired additives together according to any known process, such as a melt mixture of the two preformed polymers. When the ethylene-containing polypropylene copolymer is a polypropylene PCR then this is the preparation method used.

Thus a further aspect of the invention comprises a process for making the above defined polypropylene polymer composition, comprising blending a propylene homopolymer with a propylene-ethylene copolymer, which propylene-ethylene copolymer is preferably post consumer resin (PCR).

An alternative to physical blending is to prepare the composition of the invention in successive polymerization stages. A propylene homopolymer or copolymer is prepared in a first reactor and optionally in a subsequent second reactor, and the product transferred to a further reactor where an elastomeric polypropylene copolymer is prepared in the presence of the polymer prepared in the first reactor(s). These polymerisation reactions can be carried out in a suspension, in an inert hydrocarbon diluent, in propylene maintained in the liquid state or in the gaseous state, on an agitated bed or on a fluid bed.

The compositions of the present invention are suitable for making injection-moulded articles.

EXAMPLES

The microstructure and ethylene content was determined by quantitative nuclear-magnetic resonance (NMR) spectroscopy. Specifically, $^{13}$C-NMR was used to quantify the isotacticity and regio-regularity of the propylene homopolymers and also to quantify the comonomer content and comonomer sequence distribution of the polymers. The technique used is described in detail in WO 2017005837, pages 22-25.

Melt flow rate was measured at 230° C. according to ISO1133, with a load of 2.16 kg.

Flexural modulus was measured at 23° C. on an injected test piece having a thickness of 4 mm according to ISO178.

Notched IZOD impact resistance was measured according to ISO180/1A. The specimens were prepared according to ISO1873-2.

Examples 1-4 comprise blends of a virgin polypropylene homopolymer with polypropylene PCR, which itself contains ethylene comonomer. Two virgin polypropylene homopolymers were used.

The virgin polypropylene homopolymer which is used in inventive Examples 1 and 2 was made as described in U.S. Pat. No. 4,210,738. The catalyst used was that described in Example 1 of U.S. Pat. No. 4,210,738, and the process was similar to that described in Examples 41 and 42, except that in the present case the homopolymer was made in two reactors in series, with identical polymers being made in each reactor.

The virgin polypropylene homopolymer which is used in inventive Examples 3 and 4 was made in a single reactor bulk process using the commercial catalyst ZN312, available from Basell.

Two polypropylene PCR compositions were used. That used for Examples 1 and 3 is GRY1506 available from Veolia NL, whilst that used for Examples 2 and 4 is PP/full Jazz/Pellet/deodorized (rPP-VPR/002) available from Viridor UK.

Comparative Example C1 is the commercial polypropylene random copolymer 200-CA 13 available from Ineos, which has a similar total ethylene content to the inventive Examples.

| EXAMPLE | 1 | 2 | 3 | 4 | C1 |
|---|---|---|---|---|---|
| Polypropylene homopolymer | | | | | |
| MFR (g/10 min) | 20 | 20 | 9 | 9 | |
| Flexural modulus (MPa) | 2200 | 2200 | 1500 | 1500 | |
| Split (wt %) | 74 | 74 | 60 | 60 | |
| Polypropylene PCR | | | | | |
| MFR (g/10 min) | 21 | 14 | 21 | 14 | |
| C2 content (mol %) | 11.9 | 9.8 | 11.9 | 9.8 | |
| Flexural modulus (MPa) | 1244 | 1250 | 1244 | 1250 | |
| Notched Izod @ 23° C. (kJ/m$^2$) | 6.0 | 6.1 | 6.0 | 6.1 | |
| I(E) (%) | 11.6 | 16.5 | 11.6 | 16.5 | |
| Split (wt %) | 26 | 26 | 40 | 40 | |
| Final composition | | | | | |
| MFR (g/10 min) | 18.9 | 19 | 12.2 | 12.1 | 13 |
| C2 content (mol %) | 3.2 | 2.6 | 4.8 | 3.9 | 4.4 |
| I(E) (%) | 13.2 | 17.7 | 12.5 | 16.5 | 74.0 |
| Flexural modulus (MPa) | 1722 | 1714 | 1554 | 1521 | 1100 |
| Notched Izod @ 23° C. (kJ/m$^2$) | 3.1 | 3.2 | 3.9 | 4.0 | 6 |
| Notched Izod @ 0° C. (kJ/m$^2$) | 2.6 | 2.5 | 3.0 | 2.9 | 3.3 |

Inventive Examples 1-4 show a much higher rigidity than Comparative Example C1 but still have acceptable impact resistance, particularly at low temperature. The low values for I(E) of the inventive examples also indicate a lower randomness of the ethylene incorporation compared to the comparative examples, which is believed to be responsible for the improved balance of rigidity and impact resistance.

The invention claimed is:

1. A polypropylene composition comprising a blend of a propylene homopolymer and a propylene-ethylene copolymer containing 7-20 mol % ethylene, wherein the polypropylene composition;

has an ethylene content (E) of 0.5-7 mol %;

has an MFR of 5-50 g/10 min, measured at 230° C. according to ISO 1133 with a load of 2.16 kg; and has a relative proportion of isolated and block comonomer sequences in the polypropylene (I(E)) in the range of 5-40;

wherein I(E) is defined as I(E)=$f_{PEP}/((f_{EEE}+f_{PEE}+f_{PEP}))$*100 in which I(E) is the relative content of isolated to block ethylene sequences (in %); $f_{PEP}$ is the mol fraction of propylene/ethylene/propylene sequences (PEP) in the sample; $f_{PEE}$ is the mol fraction of propylene/ethylene/ethylene sequences (PEE) and of ethylene/ethylene/propylene sequences (EEP) in the sample; and $f_{EEE}$ is the mol fraction of ethylene/ethylene/ethylene sequences (EEE) in the sample, all sequence concentrations being based on a statistical triad analysis of $^{13}$C-NMR data.

2. The polypropylene composition according to claim 1, wherein the polypropylene composition has a relationship between ethylene content in mol % (E) and the relative proportions of isolated and block comonomer sequences in the polypropylene (I(E)) defined by I(E)<60−5E.

3. The polypropylene composition according to claim 1, wherein the polypropylene composition has an ethylene content (E) of 1-6 mol %.

4. The polypropylene composition according to claim 1, wherein the I(E) of the polypropylene composition is in the range of 10-30%.

5. The polypropylene composition according to claim 1, wherein the MFR of the polypropylene composition is in the range of 10 to 40 g/10 min measured at 230° C. according to ISO 1133 with a load of 2.16 kg.

6. The polypropylene composition according to claim 4, wherein the MFR of the polypropylene composition is in the range of 10 to 30 g/10 min measured at 230° C. according to ISO 1133 with a load of 2.16 kg.

7. The polypropylene composition according to claim 1, wherein the polypropylene composition comprises 45-90 wt % of the propylene homopolymer.

8. The polypropylene composition according to claim 1, wherein the polypropylene composition comprises 50-80 wt % of the propylene homopolymer.

9. The polypropylene composition according to claim 1, wherein the polypropylene composition comprises 55-75 wt % of the propylene homopolymer.

10. The polypropylene composition according to claim 1, wherein the polypropylene composition comprises 10-55 wt % of the propylene-ethylene copolymer.

11. The polypropylene composition according to claim 1, wherein the polypropylene composition comprises 20-50 wt % of the propylene-ethylene copolymer.

12. The polypropylene composition according to claim 1, wherein the polypropylene composition comprises 25-45 wt % of the propylene-ethylene copolymer.

13. The polypropylene composition according to claim 1, wherein the propylene homopolymer has an MFR of 1-40 g/10 min measured at 230° C. according to ISO 1133 with a load of 2.16 kg.

14. The polypropylene composition according to claim 1, wherein the propylene homopolymer has an MFR of 3-30 g/10 min measured at 230° C. according to ISO 1133 with a load of 2.16 kg.

15. The polypropylene composition according to claim 1, wherein the propylene-ethylene copolymer has an MFR of 5-50 g/10 min measured at 230° C. according to ISO 1133 with a load of 2.16 kg.

16. The polypropylene composition according to claim 1, wherein the propylene-ethylene copolymer has an MFR of 10-30 g/10 min measured at 230° C. according to ISO 1133 with a load of 2.16 kg.

17. The polypropylene composition according to claim 1, wherein the propylene-ethylene copolymer contains 8-15 mol % ethylene.

18. The polypropylene composition according to claim 1, wherein the propylene-ethylene copolymer has a relative content of isolated to block ethylene sequences (in %), I(E), of 5-30%.

19. The polypropylene composition according to claim 1, wherein the propylene-ethylene copolymer has a relative content of isolated to block ethylene sequences (in %), I(E), of 8-25%.

20. The polypropylene composition according to claim 1, wherein the propylene-ethylene copolymer has a relative content of isolated to block ethylene sequences (in %), I(E), of 10-20%.

21. The polypropylene composition according to claim 1, wherein the propylene-ethylene copolymer comprises post consumer resin (PCR).

22. The polypropylene composition according to claim 1, wherein the polypropylene composition has a relationship between ethylene content in mol % (E) and the relative proportions of isolated and block comonomer sequences in the polypropylene (I(E)) defined by I(E)<45-5E.

23. A process for making the polypropylene composition as defined in claim 1, comprising blending the propylene homopolymer with the propylene-ethylene copolymer.

24. A process for making the polypropylene composition as defined in claim 1, comprising blending the propylene homopolymer with the propylene-ethylene copolymer, wherein the propylene-ethylene copolymer is post consumer resin (PCR).

* * * * *